US007711567B2

(12) United States Patent
Sienel et al.

(10) Patent No.: US 7,711,567 B2
(45) Date of Patent: May 4, 2010

(54) TELECOMMUNICATION SYSTEM, AND SWITCH, AND SERVER, AND METHOD

(75) Inventors: Jürgen Sienel, Leonberg (DE); Dieter Kopp, Illingen (DE); Ulf Knoblich, Birkenfeld (DE)

(73) Assignee: Alcatel, Pairs (FR)

( * ) Notice: Subject to any disclaimer, the term of this patent is extended or adjusted under 35 U.S.C. 154(b) by 895 days.

(21) Appl. No.: 10/069,583

(22) PCT Filed: May 7, 2001

(86) PCT No.: PCT/EP01/05129

§ 371 (c)(1),
(2), (4) Date: Feb. 27, 2002

(87) PCT Pub. No.: WO02/03631

PCT Pub. Date: Jan. 10, 2002

(65) Prior Publication Data

US 2002/0123889 A1 Sep. 5, 2002

(30) Foreign Application Priority Data

Jun. 30, 2000 (EP) .................................. 00440198

(51) Int. Cl.
*G10L 21/00* (2006.01)
(52) U.S. Cl. ..................... 704/270.1; 704/231
(58) Field of Classification Search ................ 704/251, 704/270, 270.1, 275, 231
See application file for complete search history.

(56) References Cited

U.S. PATENT DOCUMENTS

| 5,809,464 | A | 9/1998 | Kopp et al. |
| 5,950,167 | A | 9/1999 | Yaker |
| 6,292,781 | B1 * | 9/2001 | Urs et al. .................. 704/270.1 |
| 6,377,922 | B2 * | 4/2002 | Brown et al. ................. 704/251 |
| 6,633,846 | B1 * | 10/2003 | Bennett et al. .............. 704/257 |
| 6,868,385 | B1 * | 3/2005 | Gerson ........................ 704/275 |
| 7,082,397 | B2 * | 7/2006 | Cohen et al. ............. 704/270.1 |

FOREIGN PATENT DOCUMENTS

| WO | WO 99/08084 | 2/1999 |
| WO | WO 00/33522 | 6/2000 |

OTHER PUBLICATIONS

Kiyoshi Shimokoshi et al, A Study of Voice/Non-Voice Discrimination Method Using Neural Networks for Integrated Packet Switching System, Proceedings of the International Symposium on Circuits and Systems, US, NY, IEEE, vol. Symp. 22, 1989, pp. 2096-2099, XP000131469.

* cited by examiner

*Primary Examiner*—Angela A Armstrong
(74) *Attorney, Agent, or Firm*—Sughrue Mion, PLLC

(57) ABSTRACT

Telecommunication systems including a terminal, a switch and on Internet/Intranet having a memory for storing information blocks at locations defined by addresses, can be made more user-friendly by introducing a detector for detecting speech-recognition/non-speech recognition related parts in control signals originating from the terminal and defining the addresses or n response signals sent from memory to terminal and including said information blocks. A processor is coupled to the detector for routing, in dependence on the detection, routing (parts of) the signals to a server for either conversion of (parts of) the signals or for information purposes.

9 Claims, 1 Drawing Sheet

TELECOMMUNICATION SYSTEM, AND SWITCH, AND SERVER, AND METHOD

BACKGROUND OF THE INVENTION

The invention relates to a telecommunication system comprising a terminal, a switch and at least a part of an I-net comprising a memory for storing I-net information blocks at locations defined by I-net addresses, with at least parts of said I-net addresses being generated in response to control signals originating from said terminal, and with at least parts of said I-net information blocks being sent from said memory to said terminal in the form of response signals.

Such a telecommunication system is known in the form of a telecommunication network for fixed and/or mobile communication, with said terminal being a fixed (PSTN, ISDN etc.) terminal (telephone, screenphone, pc etc.) or a wireless (cordless: DECT etc.) or mobile (GSM, UMTS etc.) terminal (wireless handset etc.), and with said I-net being an Internet and/or Intranet. Said I-net information blocks (HTML pages, web pages, WAP pages etc.) are stored at locations defined by I-net addresses (directly by Internet Protocol—IP—addresses, indirectly by Uniform Resource Locators—URLs—etc.) to be generated in response to control signals originating from said terminal and for example generated by pressing one or more keys and/or clicking on a mouse. As a result, said response signals comprising said I-net information blocks are sent from said memory to said terminal.

Such a telecommunication system is disadvantageous, inter alia, due to being user-friendly insufficiently.

BRIEF SUMMARY OF THE INVENTION

It is an object of the invention, inter alia, to provide a telecommunication system as described in the preamble, which is more user-friendly.

Thereto, the telecommunication system according to the invention is characterised in that said switch comprises a detector for defecting speech-recognition/non-speech-recognition related parts in said signals, and comprises a processor for, in response to a detection, processing said signals.

By introducing said detector and said processor, said telecommunication system can be controlled by using speech-recognition, which increases the user-friendlyness a lot.

The invention is based on the insight, inter alia, that the future will be speech-controlled.

The invention solves the problem, inter alia, of increasing the user-friendlyness.

A first embodiment of the telecommunication system according to the invention is characterised in that said control signals comprise speech-recognition related parts and/or non-speech-recognition related parts, with said processing comprising, in response to a detection of a speech-recognition related part, routing said speech-recognition related part to a server for converting said speech-recognition related part into an address signal destined for said memory, and with said processing comprising, in response to a detection of a non-speech-recognition related part, converting said non-speech-recognition related part into an address signal destined for said memory.

By detecting speech-recognition related parts and/or non-speech-recognition related parts in said control signals originating from said terminal, a user of said terminal has the option to either use keys or mouse etc. or to use speech for controlling the system. Such an option makes the system more user-friendly.

A second embodiment of the telecommunication system according to the invention is characterised in that said terminal comprises a preprocessing unit for preprocessing speech-recognition related parts of said control signals, with said server comprising a final processing unit for final processing said preprocessed speech-recognition related parts.

By introducing distributed speech recognition, the efficiency of the system is increased, which further increases the user-friendlyness.

A third embodiment of the system according to the invention is characterised in that said response signals comprise speech-recognition related parts and/or non-speech-recognition related ports, with said processing comprising, in response to a detection of a speech-recognition related part, routing said speech-recognition related part to said server, and with said processing comprising, in response to a detection of a non-speech-recognition related part, letting said non-speech-recognition related part pass to allow said non-speech-recognition related part being sent to said terminal.

By detecting speech-recognition related parts and/or non-speech-recognition related parts in said response signals originating from said memory, said server is informed of speech-recognition related parts of I-net information blocks, of which non-speech-recognition related parts flow from said memory to said terminal, which further increases the efficiency of said system.

The invention further relates to a switch for use in a telecommunication system comprising a terminal, said switch and at feast a part of an I-net comprising a memory for storing I-net information blocks at locations defined by I-net addresses, with at least parts of said I-net addresses being generated in response to control signals originating from said terminal, and with at least parts of said I-net information blocks being sent from said memory to said terminal in the form of response signals.

The switch according to the invention is characterised in that said switch comprises a detector for detecting speech-recognition/non-speech-recognition related parts in said signals, and comprises a processor for, in response to a detection, processing said signals.

A first embodiment of the switch according to the invention is characterised in that said control signals comprise speech-recognition related parts and/or non-speech-recognition related parts, with said processing comprising, in response to a detection of a speech-recognition related part, routing said speech-recognition related part to a server for converting said speech-recognition related part into an address signal destined for said memory, and with said processing comprising, in response to a detection of a non-speech-recognition related part, converting said non-speech-recognition related part into an address signal destined for said memory.

A second embodiment of the switch according to the invention is characterised in that said response signals comprise speech-recognition related parts and/or non-speech-recognition related parts, with said processing comprising, in response to a detection of a speech-recognition related part, routing said speech-recognition related part to said server, and with said processing comprising, in response to a detection of a non-speech-recognition related part, letting said non-speech-recognition related part pass to allow said non-speech-recognition related part being sent to said terminal.

The invention also relates to a server for use in a telecommunication system comprising a terminal, a switch and at least a part of an I-net comprising a memory for storing I-net information blocks at locations defined by I-net addresses, with at least parts of said I-net addresses being generated in response to control signals originating from said terminal, and with at least ports of said I-net information blocks being sent from said memory to said terminal in the form of response signals.

The server according to the invention is characterised in that said switch comprises a detector for detecting speech-recognition/non-speech-recognition related parts in said control signals, and comprises a processor for, in response to a detection, processing said control signals comprising speech-recognition related parts and/or non-speech-recognition related parts, with said processing comprising, in response to a detection of a speech-recognition related part, routing said speech-recognition related part to said server comprising a converter for converting said speech-recognition related part into an address signal destined for said memory, and with said processing comprising, in response to a detection of a non-speech-recognition related part, converting said non-speech-recognition related part into an address signal destined for said memory.

A first embodiment of the server according to the invention is characterised in that said terminal comprises a preprocessing unit for preprocessing speech-recognition related parts of said control signals, with said server comprising a final processing unit for final processing said preprocessed speech-recognition related parts.

The invention yet also relates to a method for use in a telecommunication system comprising a terminal, a switch and at least a part of an I-net comprising a memory for storing I-net information blocks at locations defined by I-net addresses, with at least parts of said I-net addresses being generated in response to control signals originating from said terminal, and with at least parts of said I-net information blocks being sent from said memory to said terminal in the form of response signals.

The method according to the invention is characterised in that said method comprises a first step of detecting speech-recognition/non-speech-recognition related parts in said signals and a second step of, in response to a detection, processing said signals.

Embodiments of the method according to the invention are in correspondence with embodiments of the telecommunication system according to the invention.

The document U.S. Pat. No. 5,809,464 discloses a dictating mechanism based upon distributed speech recognition (DSR). Other documents being related to DSR are for example EP00440016.4 (corresponding to U.S. patent application filed Jan. 17, 2001) and EP00440057.8 (corresponding to U.S. patent application Ser. No. 09/789,808 filed Feb. 22, 2001). The document EP00440087.5 (corresponding to U.S. patent application Ser. No. 09/791,562 filed Feb. 26, 2001 discloses a system for performing vocal commanding. Neither one of these documents discloses the telecommunication system according to the invention. All references including further references cited with respect to and/or inside said references are considered to be incorporated in this patent application.

BRIEF DESCRIPTION OF THE DRAWINGS

The invention will be further explained at the hand of an embodiment described with respect to a drawing, whereby FIG. 1 discloses a telecommunication system according to the invention comprising a switch according to the invention and a server according to the invention and a part of an I-net and a terminal.

DETAILED DESCRIPTION OF THE INVENTION

Figure 1:
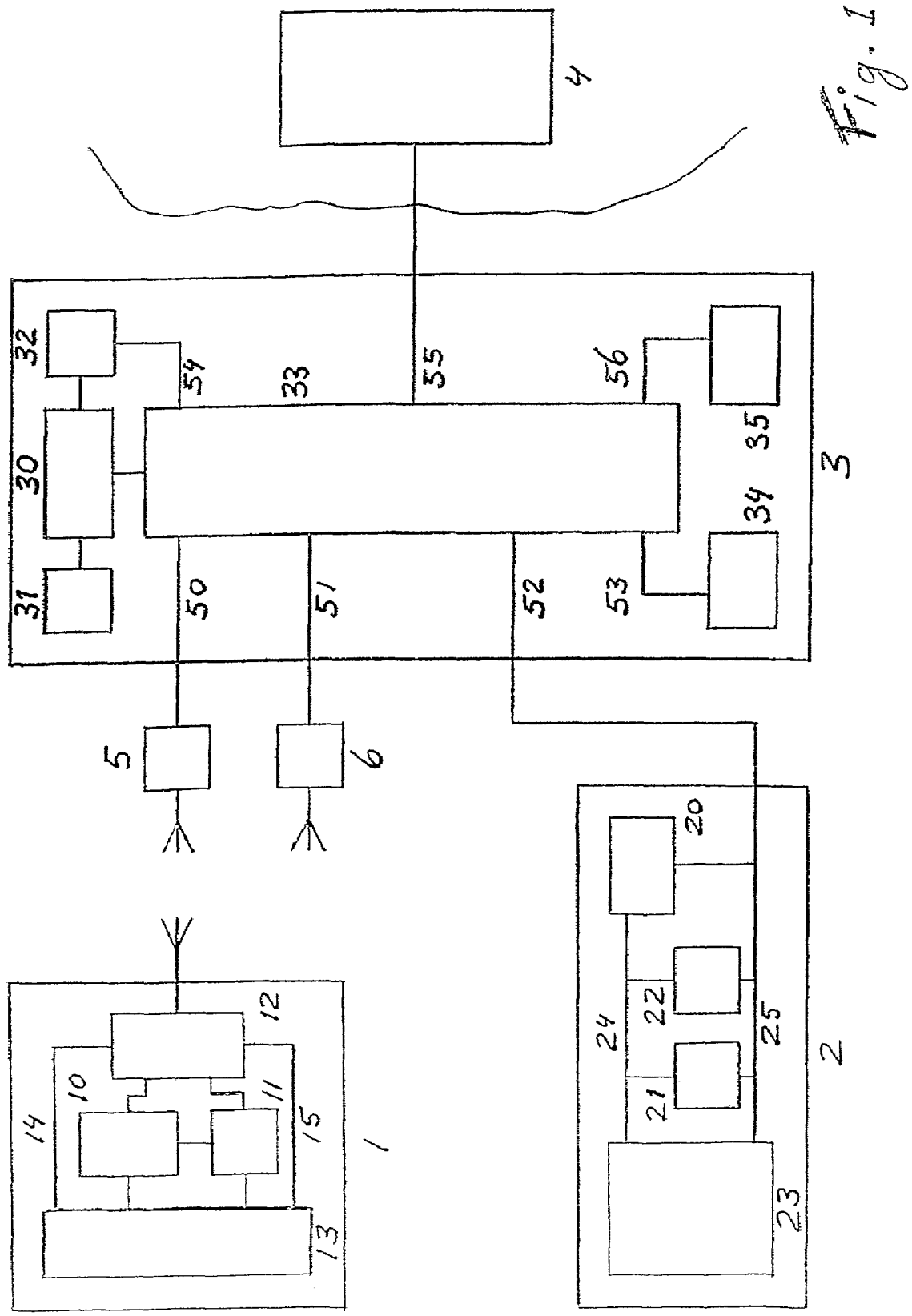

Terminal 1 as shown in FIG. 1 comprises a processor 10, a memory 11, a transceiver 12 and a man-machine-interface 13 (mmi 13). One side of transceiver 12 is coupled to an antennae and of an other side an output of transceiver 12 is coupled via a connection 14 to mmi 13 and an input of transceiver 12 is coupled via a connection 15 to mmi 13. Processor 10 is coupled via control connections to memory 11, to transceiver 12, and to mmi 13. Memory 11 is further coupled via control connections to transceiver 12 and mmi 13.

Switch 3 according to the invention as shown in FIG. 1 comprises a processor 30, a memory 31, a detector 32, a coupler 33, a first unit 34 and a second unit 35. Processor 30 is coupled via control connections to memory 31, to coupler 33 and to detector 32. Coupler 33 is coupled via a connection 50 to a base station 5 for mobile communication with terminal 1 and via a connection 51 to a base station 6 and via a connection 52 to server 2 and via a connection 53 to unit 34 and via a connection 54 to defector 32 and via a connection 55 to memory 4 forming part of an I-net (Internet/Intranet) and via a connection 56 to unit 35.

Server 2 according to the invention as shown in FIG. 1 comprises a processor 20, a memory 23, a first circuit 21 and a second circuit 22. Processor 20 is coupled via a control bus 24 to memory 23 and to circuit 21 and to circuit 22, and is coupled via a bus 25 to memory 23, to circuit 21 and to circuit 22. Bus 25 is coupled to connection 52.

The telecommunication system according to the invention as shown in FIG. 1 functions as follows.

According to a first embodiment, terminal 1 is operated in for example the so-called WAP (Wireless Application Protocol) mode or in an other Internet/Intranet related mode, as a result of which a connection (at least partly circuit-switched and/or at least partly packet-switched) is set up from terminal 1 via base station 5 and switch 3 to memory 4. In response, a first I-net information block (for example a HTML page or web page or WAP page) for example to be called 'startpage' (for example predefined and stored in memory 4 per user and/or per terminal or predefined and stored in memory 11 and sent to switch 3 together with user information and/or terminal information) is sent from memory 4 towards terminal 1 and arrives via connection 55 at coupler 33 of switch 3, in response to which processor 30 is informed of said arrival, and in response instructs coupler 33 to couple connection 55 with connection 56, as a result of which said first I-net information block is for example buffered in unit 35 having a buffer function. Then, according to the invention, processor 30 instructs defector 32 to analyse said first I-net information block, which in general will comprise one or more codes indicating that a part of said first I-net information block is speech-recognition related. Such a code for example is a so-called 'grammar' specifying a speech recognition grammar, or is for example a 'href' for example specifying <p><a href="http://www.alcatel.com">The world of Alcatel </a></p>. To be able to analyses said first I-net information block is sent from unit 35 via connection 56 and coupler 33 and connection 54 to detector 32 which performs an analysis (for example by comparing subparts of said first I-net information block with predefined subparts stored in memory 31). In response to detection of such a speech-recognition related part, detector 32 informs processor 30, which then controls coupler 33 in such a way that said speech-recognition related part is sent from unit 35 via connection 56 and coupler 33 and connection 52 to server 2 and that the non-speech-recognition related part is sent from unit 35 via connection 56 and coupler 33 and connection 50 and base station 5 to terminal 1 (for example by using user information and/or terminal information) for example in the form of a response signal. In server 2, said speech-recognition related part is supplied to bus 25, in response to which processor 20 is informed, which controls memory 23 is such a way via control bus 24 that said speech-recognition related part is stored in said memory 23 (for example together with and/or in relation to user information and/or terminal information). In terminal 1, said non-speech-recognition related part is supplied via transceiver 12 and connection 14 to mmi 13 under control of processor 10, in response to which said first I-net information block is displayed at mmi 13 (for example comprising a display and further for example comprising a loudspeaker, a microphone, a keyboard etc.).

According to a first alternative to said first embodiment, both said speech-recognition related part and said non-speech-recognition related part are together sent from unit 35 via connection 56 and coupler 33 and connection 50 and base station 5 to terminal 1, with said speech-recognition related part of course still being sent to server 2.

According to a second alternative to said first embodiment, unit 35 is not used, due to coupler 33 and processor 30 and detector 32 being sufficiently fast to detect and in response to send said non-speech-recognition related part (possibly together with said speech-recognition related part) to terminal 1 and to send said speech-recognition related part (also) to server2.

According to a second embodiment, a user operating terminal 1 and looking at said first I-net information block at mmi 13 (display) decides to order a second I-net information block (a next page). Thereto, said user for example operates mmi 13 (keyboard) in such a way that a control signal (comprising at least one non-speech-recognition related part) is generated, which via connection 15 and transceiver 12 under control of processor 10 is sent via base station 5 and connection 50 to coupler 33 of switch 3. Processor 30 is informed of this arrival, and in response instructs coupler 33 to couple connection 50 with connection 56, as a result of which said control signal is for example buffered in unit 35 having a buffer function. Then, according to the invention, processor 30 instructs detector 32 to analyse said control signal, which either at least comprises one or more codes indicating that said control signal is non-speech-recognition related (generated via the keyboard of mmi 13) or comprises one or more codes indicating that said control signal is speech-recognition related (generated via the microphone of mmi 13). To be able to analyse, said control signal is sent from unit 35 via connection 56 and coupler 33 and connection 54 to detector 32 which performs an analysis (for example by comparing subparts of said control signal with predefined subparts stored in memory 31). In response to detection of at least one non-speech-recognition related part (due to said keyboard being used), detector 32 informs processor 30, which then controls coupler 33 in such a way that said control signal is sent from unit 35 via connection 56 and coupler 33 and connection 53 to unit 34 having a conversion function. Unit 34 then converts said control signal function (for example by using user information and/or terminal information) into an address signal suitable for memory 4, which address signal either directly via connection 53 and coupler 33 and connection 55 is supplied to memory 4 or indirectly via connection 53 and coupler 33 and connection 50 and base station 5 is supplied to terminal 1, which then sends it (for example by using user information and/or terminal information) via base station 5 and connection 50 and coupler 33 and connection 55 to memory 4. As a result, memory 4 generates said second I-net information block which at least partly is sent to terminal 1 (for example by using user information and/or terminal information) and at least partly is sent to server 2, etc.

According to a first alternative to said second embodiment, unit 34 is not used, due to said control signal already comprising an address signal suitable for memory 4, etc.

According to a second alternative to said second embodiment, unit 35 is not used, due to coupler 33 and processor 30 and detector 32 being sufficiently fast to detect and in response to process said control signal etc.

According to a third embodiment, a user operating terminal 1 and looking at said first or second I-net information block at mmi 13 (display) decides to order a second or third I-net information block (a next page). Thereto, said user for example operates mmi 13 (microphone) in such a way that a control signal (comprising at least one speech-recognition related part) is generated, which via connection 15 and transceiver 12 under control of processor 10 is sent via base station 5 and connection 50 to coupler 33 of switch 3. Processor 30 is informed of this arrival, and in response instructs coupler 33 to couple connection 50 with connection 56, as a result of which said control signal is for example buffered in unit 35 having a buffer function. Then, according to the invention, processor 30 instructs detector 32 to analyse said control signal, which either at least comprises one or more codes indicating that said control signal is non-speech-recognition related (generated via the keyboard of mmi 13) or comprises one or more codes indicating that said control signal is speech-recognition related (generated via the microphone of mmi 13). To be able to analyse, said control signal is sent from unit 35 via connection 56 and coupler 33 and connection 54 to detector 32 which performs an analysis (for example by comparing subparts of said control signal with predefined subparts stored in memory 31). In response to detection of at least one speech-recognition related part (due to said microphone being used), detector 32 informs processor 30, which then controls coupler 33 in such a way that said control signal is sent from unit 35 via connection 56 and coupler 33 and connection 52 to server 2. In server 2, said control signal is supplied via bus 25 to circuit 21 having a conversion function and/or to memory 23. Together, memory 23 and circuit 21, in dependence of what has previously been stored in memory 23 in relation to the I-net information block presently shown at mmi 13, convert said control signal (for example by using user information and/or terminal information) info an address signal (suitable) for memory 4, which address signal either directly via connection 52 and coupler 33 (and possibly via unit 34) and connection 55 is supplied to memory 4 or indirectly via connection 52 and coupler 33 (and possibly via unit 34) and connection 50 and base station 5 is supplied to terminal 1, which then sends it (for example by using user information and/or terminal information) via base station 5 and connection 50 and coupler 33 and connection 55 to memory 4. As a result, memory 4 generates said second or third I-net information block which at least partly is sent to terminal 1 (for example by using user information and/or terminal information) and at least partly is sent to server 2, etc.

According to a first alternative to said third embodiment, terminal 1 comprises a preprocessing unit (not shown, possibly forming part of processor 10) for preprocessing said control signal generated via mmi 13 (microphone), in which case in server 2 circuit 22 having a final processing function for final processing said preprocessed control signal, and in which case either possibly detector 32 is able to detect speech-recognition/non-speech-recognition related parts in said preprocessed signal or possibly switch 3 comprises a further unit (not shown) for either re-preprocessing or final processing said preprocessed control signal to assist said detector 32, etc.

According to a second alternative to said third embodiment, unit 35 is not used, due to coupler 33 and processor 30 and detector 32 being sufficiently fast to detect and in response to process said control signal etc.

All embodiments are just embodiments and do not exclude other embodiments not shown and/or described. All alternatives are just alternatives and do not exclude other alternatives not shown and/or described. Any (part of an) embodiment and/or any (part of an) alternative can be combined with any other (part of an) embodiment and/or any other (part of an) alternative.

Said terminal, base station and switch can begin accordance with GSM, UMTS, DECT, ISDN, PSTN etc. Said construction of said terminal, switch and server can be amended without departing from the scope of this invention. Parallel blocks can be connected serially, and vice versa, and each bus can be replaced by separate connections, and vice versa. Said units and circuits, as well as all other blocks shown and/or not shown, can be 100% hardware, or 100% software, of a mixture of both. Each unit, circuit and block can be integrated with a processor or any other part, and each function of a processor can be realised by a separate unit, circuit or block.

For example detector 32 having a double function—detecting speech-recognition/non-speech-recognition related parts in response signals originating from memory 4 (for example said detection of said 'href' and/or 'grammar') as well as in control signals originating from terminal 1 (for example detection of codes and/or a protocol defining that certain signals originate from keyboard and/or mouse and/or that other signals do not etc.)—can be realised by separated detectors. And for example unit 34 having said conversion function may also comprise a DNS (Domain Name Server) function for converting a Uniform Resource Locator—URL—into an Internet Protocol—IP—address. However, said DNS function could also be located in server 2, etc.

The invention claimed is:

1. A telecommunication system comprising a terminal, a switch and an I-net comprising a memory for storing I-net information blocks at locations defined by I-net addresses, at least parts of said I-net addresses being generated in response to control signals originating from said terminal, and at least parts of said I-net information blocks being sent from said memory to said terminal in the form of response signals, each of said control signals and said response signals comprising both speech recognition and non-speech recognition related parts, wherein said switch comprises a detector for detecting said speech-recognition and non-speech recognition related parts in said control signals and said response signals, and a processor for, in response to a detection of said speech-recognition or non-speech recognition related parts, processing said control signals and said response signals, said I-net comprising at least one of an intranet or Internet, wherein said switch enables a simultaneous interaction with a website using both said control signal having said speech recognition related part and said control signal having said non-speech recognition related part, said I-net information blocks are web pages being sent from said memory to said terminal in the form of said response signals, and said I-net address is an Internet Protocol address of a corresponding web page, said processor, in response to a detection of a speech-recognition related part in said control signals, routes said speech-recognition related part to a server for converting said speech-recognition related part into an address signal destined for said memory, and in response to a detection of a non-speech-recognition related part in a control signal, converts said non-speech-recognition related part into an address signal destined for said memory, said address signal converted from said speech-recognition related part is a Uniform Resource Locator (URL) for an Internet server and said address signal converted from said non-speech-recognition related part is a URL for an Internet server, and the switch enables an independent use of a speech communication channel and a non-speech communication channel to navigate from a first web page to a second web page by traversing a link.

2. The telecommunication system according to claim 1, wherein the switch merges or separates said speech recognition-related parts and non-speech recognition-related parts.

3. The telecommunication system according to claim 1, wherein said terminal comprises a preprocessing unit for preprocessing said speech-recognition related parts of said control signals, and said server comprises a final processing unit for final processing said preprocessed speech-recognition related parts.

4. The telecommunication system according to claim 1 wherein said processor, in response to a detection of a speech-recognition related part in a response signal, routes said speech-recognition related part to said server, and in response to a detection of a non-speech-recognition related part in said response signal, forwards said non-speech-recognition related part to said terminal.

5. A switch for use in a telecommunication system comprising a terminal, said switch and an I-net comprising a memory for storing I-net information blocks at locations defined by I-net addresses, at least parts of said I-net addresses being generated in response to control signals originating from said terminal, and at least parts of said I-net information blocks being sent from said memory to said terminal in the form of response signals, each of said control signals and said response signals comprising both speech recognition and non-speech recognition related parts, wherein said switch comprises a detector for detecting said speech-recognition and non-speech-recognition related parts in said control signals and said response signals, and a processor for, in response to a detection of said speech-recognition or non-speech recognition related parts, processing said signals, said I-net comprising at least one of an intranet or Internet, wherein said switch enables a simultaneous interaction with a website using both said control signal having said speech recognition related part and said control signal having said non-speech recognition related part, said I-net information blocks are web pages being sent from said memory to said terminal in the form of said response signals, and said I-net address is an Internet Protocol address of a corresponding web page, said processor, in response to a detection of a speech-recognition related part in said control signals, routes said speech-recognition related part to a server for converting said speech-recognition related part into an address signal destined for said memory, and in response to a detection of a non-speech-recognition related part in said control signal, converts said non-speech-recognition related part into an address signal destined for said memory, said address signal converted from said speech-recognition related part is a Uniform Resource Locator (URL) for an Internet server and said address signal converted from said non-speech-recognition related part is a URL for an Internet server, and the switch enables an independent use of a speech communication channel and a non-speech communication channel to navigate from a first web page to a second web page by traversing a link.

6. The switch according to claim 5, wherein said processor, in response to a detection of a speech-recognition related part in said response signals, routes said speech-recognition related part to said server, and in response to a detection of a non-speech-recognition related part in said response signals, forwards said non-speech-recognition related part to said terminal.

7. A server for use in a telecommunication system comprising a terminal, a switch and an I-net comprising a memory for storing I-net information blocks at locations defined by I-net addresses, at least parts of said I-net addresses being generated in response to control signals originating from said terminal, and at least parts of said I-net information blocks being sent from said memory to said terminal in the form of response signals, each of said control signals and said response signals comprising both speech recognition and non-speech recognition related parts, wherein said switch comprises a detector for detecting said speech-recognition and non-speech-recognition related parts in said control signals and said response signals, and a processor for, in response to a detection of said speech-recognition or non-speech-recognition related parts, processing said control signals comprising speech-recognition related parts and/or non-speech-recognition related parts, with said processing comprising, in response to a detection of a speech-recognition related part, routing said speech-recognition related part to said server comprising a converter for converting said speech-recognition related part into an address signal destined for said memory, and with said processing comprising, in response to a detection of a non-speech-recognition related part, converting said non-speech-recognition related part into an address signal destined for said memory, said I-net comprising at least one of an intranet or Internet, wherein said switch enables a simultaneous interaction with a website using both said control signal having said speech recognition related part and said control signal having said non-speech recognition related part, said I-net information blocks are web pages being sent from said memory to said terminal in the form of said response signals, and said I-net address is an Internet Protocol address of a corresponding web page, said address signal converted from said speech-recognition related part is a Uniform Resource Locator (URL) for an Internet server and said address signal converted from said non-speech-recognition related part is a URL for an Internet server, and the switch enables an independent use of a speech communication channel and a non-speech communication channel to navigate from a first web page to a second web page by traversing a link.

8. The server according to claim 7, wherein said terminal comprises a preprocessing unit for preprocessing speech-recognition related parts of said control signals, with said server comprising a final processing unit for final processing said preprocessed speech-recognition related parts.

9. A method for use in a telecommunication system comprising a terminal, a switch and at least a part of an I-net comprising a memory for storing I-net information blocks at locations defined by I-net addresses, at least parts of said I-net addresses being generated in response to control signals originating from said terminal, and at least parts of said I-net information blocks being sent from said memory to said terminal in the form of response signals, each of said control signals and said response signals comprising both speech recognition and non-speech recognition related parts, said method detecting said speech-recognition and non-speech-recognition related parts in said control signals and said response signals; and in response to a detection speech-recognition or non-speech-recognition related parts in, processing said control signals or said response signals, said I-net comprising at least one of an intranet or Internet, wherein said switch enables a simultaneous interaction with a website using both said control signal having said speech recognition related part and said control signal having said non-speech recognition related part, and said I-net information blocks are web pages being sent from said memory to said terminal in the form of said response signals, and said I-net address is an Internet Protocol address of a corresponding web page, said processing, in response to a detection of a speech-recognition related part in said control signals, includes routing said speech-recognition related part to a server for converting said speech-recognition related part into an address signal destined for said memory, and in response to a detection of a non-speech-recognition related part in a control signal, includes converting said non-speech-recognition related part into an address signal destined for said memory, said address signal converted from said speech-recognition related part is a Uniform Resource Locator (URL) for an Internet server and said address signal converted from said non-speech-recognition related part is a URL for an Internet server, and the switch enables an independent use of a speech communication channel and a non-speech communication channel to navigate from a first web page to a second web page by traversing a link.

* * * * *